United States Patent [19]

Makowski et al.

[11] 4,193,901

[45] Mar. 18, 1980

[54] PROCESS FOR THE SULFONATION OF AN ELASTOMERIC POLYMER

[75] Inventors: Henry S. Makowski, Scotch Plains; Robert D. Lundberg; Jan Bock, both of Bridgewater, all of N.J.

[73] Assignee: Exxon Research & Engineering Co., Florham Park, N.J.

[21] Appl. No.: 19,312

[22] Filed: Mar. 12, 1979

Related U.S. Application Data

[63] Continuation-in-part of Ser. No. 950,415, Oct. 11, 1978, which is a continuation of Ser. No. 855,771, Nov. 29, 1977, abandoned.

[51] Int. Cl.² ............................................. C08L 91/00
[52] U.S. Cl. ..................... 260/28.5 B; 260/33.6 AQ; 260/33.8 UA; 260/42.33; 260/42.47; 260/DIG. 31; 525/353
[58] Field of Search ......... 260/33.6 AQ, 33.8, 28.5 B, 260/42.33, 42.47, DIG. 31; 526/40

[56] References Cited
U.S. PATENT DOCUMENTS

| | | | |
|---|---|---|---|
| 3,642,728 | 2/1972 | Canter | 260/23.7 M |
| 3,836,511 | 9/1974 | O'Farrell et al. | 260/DIG. 31 |
| 3,847,854 | 11/1974 | Canter et al. | 260/30.6 R |

*Primary Examiner*—Lewis T. Jacobs
*Attorney, Agent, or Firm*—Richard E. Nanfeldt

[57] ABSTRACT

An improved process for the sulfonation of an unsaturated elastomeric polymer to form a sulfonated elastomeric polymer, wherein a cement which contains an elastomeric polymer dissolved in a non-reactive solvent is contacted with a sulfonating agent at between about $-100°$ C. and $+100°$ C. for a period of time sufficient to result in the sulfonation of the elastomeric polymer wherein the improvement includes the use of a sulfonating agent which is formed from mixtures of a sulfur trioxide donor complexed with a Lewis base and a carboxylic acid anhydride

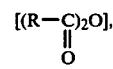

or an acyl halide

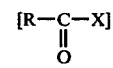

or with both, wherein R is selected from the group consisting of $CH_3-$, $C_2H_5-$, $C_3H_7-$, $C_4H_9-$, $C_5H_{11}$, $C_6H_{13}$ and $C_6H_5$ and mixtures thereof. The molar ratio of

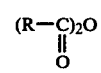

and/or

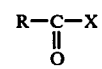

with the $SO_3$ of the complex is at least 0.5.

17 Claims, No Drawings

PROCESS FOR THE SULFONATION OF AN ELASTOMERIC POLYMER

CROSS REFERENCE TO RELATED APPLICATIONS

This application is a continuation-in-part of copending application Ser. No. 950,415 filed Oct. 11, 1978 which in turn is Rule 60 Continuation Application of Ser. No. 855,771 filed Nov. 29, 1977, now abandoned.

FIELD OF THE INVENTION

An improved process for the sulfonation of an unsaturated elastomeric polymer to form a sulfonated elastomeric polymer, wherein a cement which contains an elastomeric polymer dissolved in a non-reactive solvent is contacted with a sulfonating agent at between about −100° C. and +100° C. for a period of time sufficient to result in the sulfonation of the elastomeric polymer wherein the improvement includes the use of a sulfonating agent which is formed from mixtures of a sulfur trioxide donor complexed with a Lewis base and a carboxylic acid anhydride

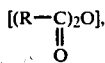

or an acyl halide

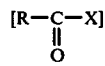

or with both, wherein R is selected from the group consisting of $CH_3-$, $C_2H_5-$, $C_3H_7-$, $C_4H_9-$, $C_5H_{11}$, $C_6H_{13}$ and $C_6H_5$ and mixtures thereof. The molar ratio of

and/or

with the $SO_3$ of the complex is at least 0.5.

BACKGROUND OF THE INVENTION

Recently, a new class of thermoelastic sulfonated polymers have been described in a number of U.S. Patents, wherein these sulfonated elastomeric polymers have been produced from commercial elastomeric polymers by either sulfonating with a sulfur trioxide complexed with a Lewis base or an acyl sulfate.

The sulfonated elastomeric polymer of these patents were produced from elastomeric polymers having Mooney viscosities (ML, 1+8, 212° F.) of about 50 to about 90. The high melt viscosities and molecular weights of the initial elastomeric polymers resulted in sulfonated elastomeric polymers having extremely high melt viscosities thereby limiting their use on conventional mixing and fabrication equipment.

Commercial hydrocarbon elastomers such as Vistalon 2504, Vistalon 3708, Vistalon 4608, and Butyl 365 contain some volatile components, most of which is water. The volatiles contents depend on polymer type and Mooney viscosity but are generally not below 0.5 wt. %, more normally not below about 0.3 wt. % and only on occasion lower. Indeed water contents of hydrocarbon polymers vary with the severity of finishing conditions and can vary widely even from bale to bale. When such wet commercial polymers are sulfonated with the reagents described in earlier patents, the incorporation of sulfur is lowered and excesses of reagents are required; however, variable water means variable sulfur levels and off-specification products. In the study of sulfonation reactions, those skilled in the art frequently dry the hydrocarbon polymer further, for example, by mixing on a hot rubber mill or by air or vacuum oven drying. Water levels are also significantly reduced by hot extrusion of the commercial polymers, an operation designed to lower the molecular weight and the viscosity of the base polymer.

During the manufacture of elastomeric polymers, the percentage of retained water is increased as the Mooney viscosity decreases. For example, an EPDM terpolymer having a 20 Mooney viscosity at 212° F., generally contains at least 1.0 wt. % water and could have as high as 3.0 wt. % of retained water.

The two previously taught methods of sulfonation as described in the following patents work readily on elastomeric polymers having less than 0.1 wt. % of water. However, as the percentage of retained water increases, not only does the degree of sulfonation decrease, but also the undesirable side reaction of sulfation occurs as will be clearly illustrated in the main embodiment of the present instant invention.

U.S. Pat. No. 3,642,728, herein incorporated by reference, clearly teaches a method of selective sulfonation of olefinic unsaturation sites of an elastomeric polymer such as Vistalon 3509 having a Mooney of 90 to form a sulfonated elastomeric polymer. The olefinic unsaturation sites of the elastomeric polymer are sulfonated by means of a sulfur trioxide complexed with a Lewis base. However, the reactions of ethereal complexes of $SO_3$ with the unsaturation of polymer chains is non-quantitative and so excess complex is desirable to give the required amount of sulfonation. The sulfonate groups of the sulfonated elastomer can be readily neutralized with a basic material to form an ionically cross-linked elastomer having substantially improved physical properties over an unsulfonated elastomer at room temperature. However, these ionically cross-linked elastomers, may be processed like a conventional thermoplastic at elevated temperatures under a shear force in the presence of selected preferential plasticizers which dissipate the ionic associations at the elevated temperatures thereby creating a reprocessable elastomer. If an EPDM contains no moisture and no reagent consuming materials, such as calcium stearate slurry aid used in the plant isolation of the EPDM, the $SO_3$ complexes will react essentially quantitatively to the polymeric sulfonic acid.

If an EPDM terpolymer containing 5-ethylidene-2-norborene as the third monomer having a Mooney viscosity of 20 and more than 0.1 wt. % water is sulfonated with 30 mmoles of reagent per 100 g of EPDM according to this method, the conversion of the $SO_3$ complex to sulfonate and sulfate is less than 65 percent due to the reaction of the water with the complex to generate sulfuric acid and free Lewis base.

The sulfuric acid may react with the unsaturation sites of the elastomeric polymer to produce hydrolytically and thermally unstable sulfates rather than the desired sulfonate groups. This is the case when 5-ethylidene-2-norbornene is the third monomer in the EPDM. At best, the sulfuric acid is relatively unreactive with the available unsaturation sites of the polymer and does not take part in further reactions.

U.S. Pat. No. 3,836,511, herein incorporated by reference, teaches an improved process for the sulfonation of the olefinic unsaturation sites of the elastomeric polymer, wherein the improved sulfonating agent is selected from acetyl sulfate, propionyl sulfate and butyryl sulfate. The neutralizing agents employed to neutralize the sulfonated elastomeric polymers are organic amines. This patent clearly teaches that the acyl sulfate is generated at a molar ratio of acid anhydride to sulfuric acid of 1.4:1 or less. This sulfonating agent works readily on the elastomeric polymers embodied by this patent, namely Vistalon 4608, if these polymers contain less than 0.1 wt. % retained water; and Butyl rubber 268 having a 55 Mooney and less than 0.1 wt. % retained water. When an EPDM terpolymer having a 20 Mooney and more than 0.5 wt. % water of the present invention is sulfonated with the complex in the absence of an acyl halide or carboxylic acid anhydride, a conversion of less than about 35 percent is realized. The water reacts with the generating sulfonating agent to yield Lewis base and sulfuric acid, neither of which is a sulfonating agent for the olefinic unsaturation sites of the elastomeric EPDM terpolymer.

U.S. Pat. Nos. 3,779,974; 3,770,582; and 3,912,605 herein incorporated by reference, teach the process method of U.S. Pat. No. 3,836,511, wherein a Butyl rubber having a 55-60 Mooney is sulfonated.

The present invention is concerned with the use of improved sulfonating agents and a process for the sulfonation of an elastomeric polymer having more than 0.2 wt. % water to produce a sulfonated elastomeric polymer, wherein at least 70% of the amount of sulfonating agent present in the reaction zone that does not exceed the stoichiometric amount of sulfonating agent required to react with all available unsaturation in the elastomeric polymer is converted to sulfonate groups in the elastomeric polymer. More preferably the conversion is at least 80% and most preferably 85%, wheren the molar ratio of the sulfonating agent available unsaturation sites in the polymer is 1.0 or less.

SUMMARY OF THE INVENTION

It has been surprisingly found that the sulfonating agents can be used to sulfonate elastomeric polymers having more than 0.2 wt. % water to conversion levels, based on the conversion of sulfonating agent to incorporated sulfur in the sulfonated elastomeric polymer, of more than about 70 percent; more preferably more than about 80 percent; and most preferably more than about 85 percent.

The present invention describes an improved process for the sulfonation of elastomeric polymers having more than 0.2 wt. % water to a conversion level, based on the conversion of sulfonating agent to incorporated sulfur in the sulfonated elastomeric polymer, of at least about 70 percent; more preferably at least about 80 percent; and most preferably at least about 85 percent, wherein the % conversion is based upon the sulfonating agent being present in the stoichiometric amounts to the amount of available unsaturation in the elastomeric polymer; that is, the molar ratio of sulfonating agent to available unsaturation sites in the elastomeric polymer is 1.0 or below.

The improved sulfonation agents for the improved sulfonation process are a mixture of a sulfur trioxide donor complexed with a Lewis base containing oxygen, phosphorous or sulfur with an acid anhydride

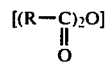

or an acid halide

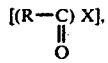

wherein R is an aliphatic hydrocarbon or an aromatic hydrocarbon radical and X is selected from the group consisting essentially of F, Cl or Br.

GENERAL DESCRIPTION OF THE INVENTION

The present invention relates to an improved process for the sulfonation of elastomeric polymers having more than about 0.2 wt. % water.

The improved sulfonation agent combination can be formed by simply mixing the constituents together or generated through the reaction of various other reagents. Exemplary systems for generating the reagents are described below.

I. Complex of Sulfur Trioxide•Lewis Base and Carboxylic Acid Anhydride

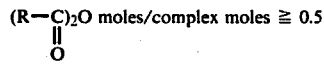

wherein the complex is an $SO_3$ donor•Lewis base.

II. Complex of Sulfur Trioxide•Lewis Base and Acyl Halide

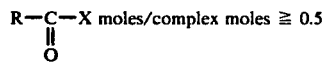

wherein the complex is an $SO_3$ donor•Lewis base.

In these instances, if any of the $SO_3$ complex sulfonation reagent decomposes through co-reaction with water

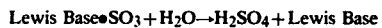

a new sulfonation reagent is quickly regenerated through the reaction of the newly formed sulfuric acid with the excess carboxylic acid anhydride or excess acyl halide which is mixed with the $SO_3$ donor•Lewis base (complex)

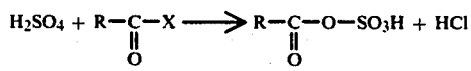

Since the carboxylic acid anhydride and acyl halide are equally effective in reaction with sulfuric acid thereby maintaining reagent strength, then mixtures of the two can be employed.

The molar ratio of SO₃ donor to the Lewis base complexing agent may be as high as 15 to 1, preferably less than about 9:1, more preferably about 4:1 to about 1:1, e.g. 2:1.

III. Complex of SO₃•Lewis Base Carboxylic Acid Anhydride and Acyl Halide

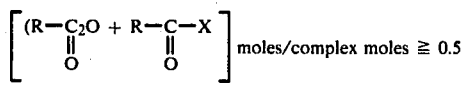

wherein the complex is an SO₃ donor•complex.

The carboxylic acid anhydride or the acyl halide or both can be added to the wet polymer cement followed by the addition of a solution of the complex of the SO₃ donor•Lewis base. Alternatively, the carboxylic acid anhydride or the acyl halide can be mixed with the solution of the SO₃ donor•Lewis base prior to the addition to the polymer cement.

The carboxylic acid anhydrides and acyl halides are derived from carboxylic acids having a solubility of at least about 0.2 grams/100 ml. of water at 25° C. Typical carboxylic acid anhydrides and acyl halides are selected from the group derived from acetic acid, propionic acid, butyric acid, valeric acid, caproic acid, or benzoic acid and mixtures thereof. The preferred carboxylic acid anhydride is acetic anhydride because of its low molecular weight, availability and effectiveness.

The acyl halides are selected from the group consisting of acyl fluoride, acyl chloride, and acyl bromide, preferably the acyl chloride. Just as with the carboxylic acid anhydride, the preferred acyl chloride is acetyl chloride because of its low molecular weight, its availability and its effectiveness.

Therefore, the sulfonating agent of the present invention can be generally defined as a mixture of a carboxylic acid anhydride or an acyl halide or both with a complex of a sulfur trioxide donor and a Lewis base containing oxygen, sulfur or phosphorous wherein the molar ratio of acid anhydride or acyl halide or both to the SO₃ of the complex is at least about 1 and at least 70% of the amount of sulfonating agent present in the reaction zone that does not exceed the stoichiometric amount of sulfonating agent required to react with all the available sites of unsaturation in the elastomeric polymer is converted to sulfonate groups on said elastomeric polymer; more preferably the conversion is at least 80%, and most preferably the conversion is at least 85%, wherein the molar ratio of sulfonating agent is available unsaturation sites in the elastomeric polymer is 1.0 or less.

The % conversion, or conversion level, is based on the conversion of the reagent to sulfur-containing groups incorporated within the sulfonated polymers. Sulfonate groups are those groups containing the SO₃ moiety connected through sulfur atom to a carbon atom

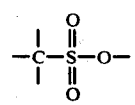

The sulfonate group introduced via sulfonation is typically a sulfonic acid

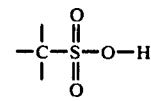

or other sulfonate precursor group depending upon the olefinic structure to be sulfonated. These compounds are generally easily reacted with metallic bases to the corresponding metal sulfonates

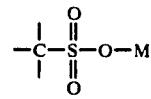

During titration of sulfonated polymers with sodium hydroxide, or other metallic bases, the sulfonate compounds consume 1 equivalent of sodium hydroxide

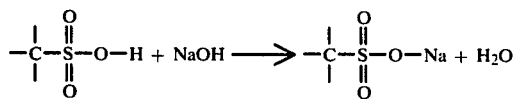

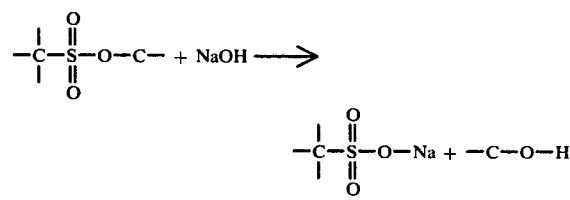

Sulfonate groups are those groups containing the SO₄ moiety connected to a carbon atom within the polymer through one of the oxygen atoms

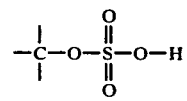

During titration of sulfonated polymers with bases such as sodium hydroxide sulfates consume two equivalents of base per sulfate group or per mole of sulfur

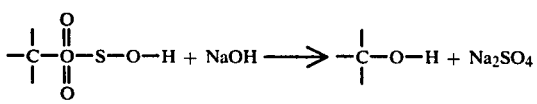

to produce a neutral alcohol and sodium sulfate.

Sulfonated polymers can be readily analyzed for their sulfur contents through procedures such as the Dietert method and the Paar method. When the sulfur content determined from sulfur analysis corresponds on a molar basis to the equivalents of base consumed during titration all of the combined sulfur is in sulfonate form. However, if the equivalents of base consumed during titration exceeds that of the molar sulfur content, then at least some of the combined sulfur is in sulfate form. When all of the sulfur is in sulfate form, then the equivalents of base is exactly twice that of the molar sulfur content.

When sulfation occurs in the absence of sulfation, the sulfation reaction is a very low-yield reaction (based on the conversion of the original sulfonating agent to sulfur containing groups within the polymer). Consequently, high-yield sulfonation reactions can be considered to result in little, if any, sulfation.

The sulfonating agent reacts with the elastomeric polymers of this invention through unsaturation sites of the elastomeric polymer and not through the saturated backbone. Thus, the achievable sulfonate content is limited by the amount of available unsaturation in the elastomeric polymer. For example, if the polymer contains 20 mmoles of unsaturation per 100 grams of polymer, then it will be possible to introduce only about 20 mmoles of sulfonate groups per 100 grams of polymer. If higher sulfonate contents are desired, then the starting polymer must contain at least as much unsaturation.

It should be obvious to those skilled in the art that when an excess sulfonating agent is added on a molar basis to an unsaturated polymer, the conversion of sulfonating agent to sulfur-containing groups can never be 100%. For example, when two moles of sulfonating agent are added per mole of available unsaturation, a maximum conversion of only 50% is possible. It is certainly within the scope of this invention to use excesses of reagent and obtain reduced conversions of sulfonating agent. However, this is both unnecessary and undesirable. Of course, reagent cost increases, and in some instances some undesirable side reactions can occur with excess reagent present. In addition, the subsequent neutralization of the sulfonation mixture becomes more complicated and costly due to the larger quantities of base required for full neutralization of the sulfonation mixture.

For the invention described herein, conversion of the reagent has been determined under conditions where the molar ratio of sulfonating agent to available unsaturation is 1.0 or below. If, for example, the polymer contains 50 mmoles of unsaturation per 100 grams of polymer, no more than 50 mmoles of reagent can be used to determine reagent conversion. Generally it is desirable to use less than one mole of reagent per mole of available unsaturation to achieve the sulfonate levels which produce desirable changes in polymer properties. Although higher levels of sulfonating agent can be used for the process of introducing sulfonate groups, the efficiency of the sulfonation reaction cannot be determined under these conditions.

The amount of desirable sulfonation depends on the particular application. Preferably, the elastomeric polymer is sulfonated at about 100 to about 100 meq. sulfonate groups/100 g of polymer, more preferably at about 10 to about 50 meq. sulfonate groups/100 g of polymer, and most preferably at about 20 to about 40 meq. sulfonate groups/100 g of polymer. The sulfonate content of the polymer is determined by both titration of the sulfonate groups and Dietert sulfur analysis. In the titration of the sulfonate groups, the polymer is dissolved in solvent consisting of 95 parts of toluene and 5 parts of methanol at a concentration level of 50 grams per liter of solvent. The polymeric sulfonate is titrated with ethanolic sodium hydroxide to an Alizarin-Thymolphthalein end point.

The elastomeric polymers of the present invention which are sulfonated by the aforementioned sulfonating agents are derived from synthetic and natural polymers having olefinic unsaturation sites through which sulfonation occurs, wherein the polymer has from about 0.1 to about 5.0 mole % olefinic unsaturation. The unsaturation sites can be in the polymer backbone, pendant therefrom or cyclic, except that aromatic containing polymers are excluded from this description. In particular, the unsaturated polymers of this present invention include low unsaturated elastomeric polymers such as Butyl rubber, or EPDM terpolymers.

Alternatively, other unsaturated polymers are selected from the group consisting of partially hydrogenated polyisoprenes, partially hydrogenated polybutadienes, Neoprene, styrene-butadiene copolymers and isoprene-styrene random copolymers. Highly unsaturated elastomers other than Neoprene, such as polybutadiene would be contemplated in this invention in terms of pacifying the water contained in the sulfonation cement. However, such high unsaturation polymers gel with the reagents of this invention and useless products result.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by wt. of a conjugated multiolefin having from about 4 to 14 carbon atoms, e.g. isoprene. The resulting copolymer contains 85 to 99.8% by wt. of combined isoolefin and 0.2 to 15% of combined multiolefin. Butyl rubber generally has a Staudinger molecular weight of about 20,000 to about 500,000, preferably about 25,000 to about 400,000 especially about 100,000 to about 400,000 and a Wijs Iodine No. of about 0.5 to about 50, preferably 1 to 15. The preparation of Butyl rubber is described in U.S. Pat. No. 2,356,128 which is incorporated herein by reference. For the purpose of this invention, the Butyl rubber may have incorporated therein from about 0.2 to 10% of combined multiolefin, preferably about 0.5 to about 6%, more preferably about 1 to about 4%, e.g. 2%. Illustrative of such a Butyl rubber is Exxon Butyl 268 (Exxon Chemical Co.), having a mole percent unsaturation of about 2.0% and a Mooney viscosity (ML 1+3, 260° F.) of about 50–60.

Low molecular weight Butyl rubbers, i.e., Butyl rubbers having a viscosity average molecular weight as measured by GPC of about 5,000 to 85,000 and a mole percent unsaturation of about 3 to about 4% may be sulfonated by the process of this invention. Preferably, these polymers have a viscosity average molecular weight as measured by GPC of about 25,000 to about 60,000.

The term "EPDM" is used in the sense of its definition as found in ASTM-D-1418-64 and is intended to mean a terpolymer containing ethylene and propylene in the backbone and a diene in a side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 40 to about 75 wt. % ethylene and about 1 to about 10 wt. % of a diene monomer, the balance of the polymer being propylene. Preferably, the polymer contains about 45 to about 70 wt. % ethylene, e.g. 50 wt. % and about 2.6 to about 9.0 wt. % diene monomer, e.g. 5.0 wt. %. The diene monomer is preferably a nonconjugated diene. The $\overline{M}n$ as measured by GPC of the terpolymer is preferably about 10,000 to about 200,000, more preferably about 15,000 to about 100,000, and most preferably about 20,000 to about 60,000. The Mooney viscosity (ML 1+8) of the terpolymer at 212° F. is preferably 5 to 60, more preferably 10 to 50 and most preferably 15 to 40, e.g. 20. The Mv as measured by GPC of the EPDM is preferably below about 350,000 and more preferably below about 300,000, e.g. 270,000. The Mw as measured by GPC of the EPDM is preferably below about 500,000 and more preferably below about 350,000 e.g. 343,000.

Illustrative of these nonconjugated diene monomers which may be used in the EPDM terpolymer (EPDM) are 1,4-hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.) a terpolymer having a Mooney viscosity at 212° F. of about 40, and having 50 wt. % of ethylene, 45 wt. % of propylene and 5.0 wt. % of 5-ethylidene-2-norbornene. Vistalon 3708 (Exxon Chemical Co.) is a terpolymer having a Mooney viscosity at 260° F. of about 45–55 and having about 64 wt. % of ethylene, about 3.3 wt. % of 5-ethylidene-2-norbornene and about 32.7 wt. % propylene. Vistalon 6505 (Exxon Chemical Co.) is a terpolymer having a Mooney viscosity at 260° F. of about 45–55 and having about 53 wt. % of ethylene, about 9.0 wt. % of 5-ethylidene-2-norbornene and about 38 wt. % of propylene. Nordel 1320 (DuPont) is another EPDM terpolymer having a Mooney viscosity at 212° F. of about 25 and having about 53 wt. % of ethylene and about 3.5 wt. % of 1,4-hexadiene. The aforementioned elastomeric polymers can be broken down through a combination of shear and heat such as in an extruder to form lower molecular specier having lower Mooney viscosities. For example, Vistalon 2504 can be reprocessed through an extruder to a Mooney viscosity at 212° F. of 20 with an $\overline{M}n$ of about 26,000 and an $\overline{M}w$ of about 125,000, wherein the reprocessed V-2504 is designated as Vistalon 2504-20.

In carrying out the sulfonation process of the present invention, a cement which contains an olefinically unsaturated elastomeric polymer dissolved in a solvent is contacted with a sulfonating agent, wherein the solvent is non-reactive to the sulfonating agent and to the unsaturated elastomeric polymer. The solvent is preferably a cycloaliphatic hydrocarbon, an aliphatic hydrocarbon, chlorinated aliphatic hydrocarbon or a halogenated aromatic hydrocarbon. Illustrations of these solvents are: isopentane, cyclopentane, n-pentane, cyclohexane, isohexane, n-hexane, heptane, 1,2-dichloroethane, methylene chloride or chlorobenzene, and mixtures thereof. The concentration of the elastomeric polymer in the neutral solvent is about 2 to about 25 wt. %, more preferably about 5 to about 20, and most preferably about 10 to about 15.

The sulfonating agent is formed from a mixture of a carboxylic acid anhydride or acyl halide with a sulfur trioxide donor complexed with a Lewis base containing oxygen, sulfur or phosphorous. Alternatively, the carboxylic acid anhydride or acyl halide is added to the sulfonation cement followed by the SO$_3$ donor.Lewis base complex. The term "sulfur trioxide donor" as used in the specification means a compound containing available sulfur trioxide. Illustrative of such sulfur trioxide donors are SO$_3$, chlorosulfonic acid, and fluorosulfonic acid. The term "complexing agent" as used in the specification means a Lewis base suitable for use in the practice of this invention, wherein Lewis base is an electron pair donor. Illustrative of Lewis bases suitable for use as complexing agents are certain phosphorous compounds. While the phosphorous compound may be either inorganic or organic, it is preferred that the phosphorous compound be an organic compound. Various organic phosphites, phosphinites, phosphinates, phosphonates, phosphates, phosphonites, and phosphines may be used as the complexing agent. The organic substituents consist of $C_1$ to $C_{10}$ alkyl, aryl, alkaryl or aralkyl groups. Ethers and thioethers have been found useful for complexing sulfur trioxide donor to moderate reaction with the unsaturation of polymer molecules. The ethers and thioethers may contain one, two or more ether oxygens or sulfurs and may be linear or cyclic. Illustrative of the ether Lewis bases suitable for use in the practice of this invention are paradioxane, 2,3-dichloro-1,4-dioxane, metadioxane, 2,4-dimethyl-1,3-dioxane, 2-phenyl-1,3-dioxane, diethyl ether, trioxane and bis (2-dichloroethyl)-ether. The preferred oxygen containing bases are p-dioxane, tetrahydrofuran and bis-(2-dichloroethyl) ether. Illustrative of the thioethers are: diethyl sulfide, dibutyl sulfide, and tetrahydrothiophene. Other oxygen containing Lewis bases suitable as complexing agents are carboxylic acid esters, wherein the carboxylic acid is a $C_1$ to $C_{10}$ aliphatic acid, benzoic acid or phenylacetic acid. Illustrative of such esters are benzyl acetate, butyl acetate, butyl propionate, methyl benzoate, hexyl acetate, isobutyl benzoate, ethyl-o-bromobenzoate, p-nitrophenyl acetate, ethyl-n-butyrate, ethyl stearate and ethyl phenyl acetate. The preferred solvents for preparation of the complexes of sulfur trioxide donor with complexing agents containing oxygen are chlorinated hydrocarbons. Illustrative of such chlorinated solvents are carbon tetrachloride, dichloroethane, chloroethane, chloroform, and methylene chloride. The complexes may also be prepared by direct addition of reagents, if precautions are taken to dissipate evolved heat.

The acid anhydride

or acyl halide

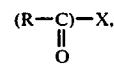

wherein R is selected from the group consisting of an aliphatic or aromatic hydrocarbon radical such as CH$_3$, C$_2$H$_5$, C$_3$H$_7$, C$_4$H$_9$, C$_5$H$_{11}$, C$_6$H$_{13}$ or C$_6$H$_5$ is added to a cement of the elastomeric polymer prior to the addition of the solution of the complex of the sulfur trioxide donor with the Lewis base or alternatively can be added to the complex prior to addition to the cement.

The complex is highly reactive to water as illustrated by the following equation:

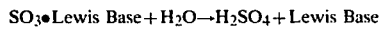

If the elastomeric polymer has only 0.5 wt. % of water (27.8 mmoles per 100 grams of polymer), the water can almost completely consume the complex, when the elastomeric polymer is to be sulfonated to a level of about 25 to about 35 mmoles of sulfonate groups. In the sulfonation of unsaturated elastomers, the H$_2$SO$_4$ generated from the decomposition of the complex by reaction with water is incapable of forming sulfonate groups; e.g.

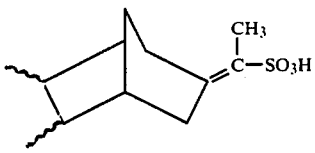

but rather forms sulfates

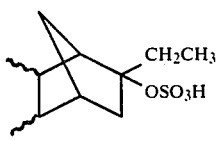

The formation of the sulfate groups is highly undesirable. Thermally these neutralized sulfate groups are less stable than those of the sulfonate groups. Furthermore, the sulfate groups are readily hydrolyzed whereas the desired sulfonate form of the elastomeric polymers are gel-free and hydrolytically stable. Gel-free means that the sulfonated polymer contains less than about 5 wt. % gel, more preferably less than about 3, and most preferably less than about 1 as measured by stirring a given weight of polymer in a solvent comprised of 95 toluene/5 methanol at a concentration of 50 g/liter for 24 hours, allowing the mixture to settle, withdrawing a weighed sample of the supernatant solution and evaporating to dryness.

Hydrolytically stable means that the acid function, in this case the sulfonic acid, will not be eliminated under neutral or slightly basic conditions to a neutral moiety which is incapable of being converted to a highly ionic functionality. When the sulfate hydrolyzes, the polymer functionality is reduced to an alcohol which has no ionic properties and all coulombic attractions are lost. Therefore, during the sulfonation reaction of unsaturated elastomers containing highly substituted unsaturation, it is necessary to minimize the adverse effect of water. Most often, the water is present in the elastomeric polymer to be sulfonated, wherein the elastomeric polymer has not been thoroughly dried, i.e. the elastomeric polymer contains more than about 0.1 wt. % water. U.S. Pat. No. 3,642,728 teaches that the reactions of complexes of $SO_3$ with the unsaturation sites of polymer chains is non-quantitative and that it is desirable to use excess complex to give the required amount of sulfonation. However, although by using excess reagent, higher sulfur contents are obtained complexities arise in unavoidable side reactions occurring such as with sulfuric acid, and the economics of manufacture are effected. In addition, the neutralization chemistry of such a sulfonated system is complex and also expensive and results in the incorporation of undesirable inorganic salts in the isolated neutralized sulfonated elastomer. For these reasons, it is undesirable to use excesses of $SO_3$ complexes. In fact, it is most desirable to obtain high conversions and thereby use little or no excess. High conversions of $SO_3$ donor•Lewis base complexes to the sulfonated elastomeric polymer can be readily achieved through the use of carboxylic acid anhydrides and acyl halides. Most all commercial elastomers are isolated through "steam stripping", a process where the polymer cement is added to hot water and the hydrocarbon solvent is flashed off leaving a water-wet polymer crumb. The crumb is generally dewatered and dried in suitably designed extruders. Extremely low molecular weight polymers, which are especially desirable for the preparation of thermoelastic materials through sulfonation, are very difficult to dry and frequently contain more water than their higher molecular weight counterparts. And so it is difficult to reproducibly sulfonate such wet polymers unless accurate water analyses are available for each batch of polymer to be sulfonated. Since water levels are frequently quite variable, it becomes impractical to analyze or even rely on what analyses are obtained. According to this invention, even wet polymer cements can easily be sulfonated to quality products containing the precise number of sulfonate groups desired.

The hydrocarbon cements of elastomeric polymers of the present invention have about 0.1 to about 5 wt. % of water, more preferably about 0.2 to about 4.0 and most preferably about 0.2 to about 3 based on the elastomeric polymer.

While frequently the source of water in polymer cements is the undried base polymer itself, it is possible that water can find its way to the polymer cement in other ways. For example, the solvent for preparing the polymer cement may contain water, the sulfonation kettle may not have been dried after cleaning, and leaking water or steam lines may result in a wet sulfonation cement.

Sulfonation of the elastomeric polymer is conducted at a temperature between $-100°$ C. to $+100°$ C., wherein the reaction time is about 1 to about 60 minutes, more preferably about 5 to about 45 minutes and most preferably about 15 to about 30 minutes. The sulfonation of less substituted olefinic structures such as derived from 1,4-hexadiene terpolymers requires somewhat higher temperatures, e.g. 50° C., when unsaturation levels are low, e.g. less than 2 mole %. More highly substituted olefinic structures, such as derived from 5-ethylidene-2-norbornene are rapidly sulfonated at room temperature and below even at low levels of unsaturation. The generated sulfonated elastomeric polymer is soluble in the solvent of the cement. The sulfonation reaction is quenched with an aliphatic alcohol such as methanol, ethanol, isopropanol, benzyl alcohol, a cycloaliphatic alcohol, such as cyclohexanol, or an aromatic hydroxyl compound such as phenol.

The amount of desirable sulfonation depends on the particular application. Preferably, the elastomeric polymer is sulfonated at about 10 to about 100 meq. sulfonate groups/100 g of sulfonated polymer, more preferably at about 10 to about 50 meq. sulfonate groups/100 g of sulfonated polymer, and most preferably at about 20 to about 40 meq. sulfonate groups/100 g of sulfonated polymer. The meq. of sulfonate/100 g of polymer is determined by both titration of the polymeric sulfonate and Dietert sulfur analysis. In the titration of the sulfonated polymer, the polymer is dissolved in solvent consisting of 95 parts of toluene and 5 parts of methanol at a concentration level of 50 grams per liter of solvent. The sulfonate is titrated with ethanolic sodium hydroxide to an Alizarin Thymolphthalein end point.

Polymers containing unsaturation and sulfonate groups have been found to be somewhat deficient in thermostability. Therefore, it is desirable to neutralize a substantial portion of the sulfonate groups as part of the manufacturing of sulfonated elastomeric polymer. In addition, neutralization is required to fully develop the physical properties of the sulfonated polymer. In preparing the ionomer, it is desirable to neutralize essentially every sulfonate group. However, lower degrees of neutralization, e.g. 95% are useful in the practice of this invention.

The neutralizing agents of the present invention are the metal hydroxides, metal carbonates, metal alkoxides having about 1 to about 8 carbon atoms or metallic salts of carboxylic acids, wherein the metal ion of the metallic salt of the carboxylic acid is selected from the group consisting of iron, aluminum, antimony, lead and Groups I-A, II-A, I-B, and II-B of the Periodic Table of Elements and mixtures thereof. The neutralization agents, which are dissolved in water or alcohols or mixtures thereof, are added to the cement of the sulfonated elastomeric polymer thereby neutralizing the sulfonate groups.

The carboxylate ion of the metallic salt of the carboxylic acid is derived from the following carboxylic acids as illustrated in the present invention; acetic, benzoic, lauric, palmitic, myristic, decanoic, octanoic, and stearic. However, other carboxylic acids of the same generic class can be readily employed and are considered within the spirit and scope of the invention. Useful examples of metal hydroxides are NaOH, KOH, LiOH, $Mg(OH)_2$ and $Ba(OH)_2$. Useful carbonates are the alkali metal carbonates.

The metal sulfonate containing polymers at the higher sulfonate levels possess extremely high melt viscosities and are thereby difficult to process. The addition of ionic group plasticizers markedly reduce melt viscosity and frequently enhances physical properties.

The preferential plasticizer is selected from the group consisting of a carboxylic acid or metal salts of these carboxylic acids, wherein the metal ion of the metal salt of the carboxylic acid is selected from the group consisting of iron, aluminum, antimony, lead and Groups I-A, II-A, I-B and II-B of the Periodic Table of Elements and mixtures thereof. The preferential plasticizer is incorporated into the neutralized sulfonated EPDM terpolymer at about 3 to about 60 parts per hundred by weight of neutralized sulfonated elastomeric polymer, more preferably at about 5 to about 40, and most preferably at about 7 to about 25. The neutralizing agent and plasticizer can be the same chemical species such as a metallic salt of fatty acid in which case additional metallic salt of the fatty acid is added over what is needed for neutralization. Alternatively, other preferential plasticizers are selected from carboxylic acid esters, trialkyl phosphates, amines, or amides and mixtures thereof. The preferred plasticizers are selected from fatty acids or metallic salts of fatty acids and mixtures thereof. The preferred fatty acid is stearic acid. The resultant neutralized sulfonated elastomeric polymer with preferential plasticizer is isolated as a crumb from the solution by conventional steam stripping and filtration. The wet crumb can be dried in a dewatering extruder, in a fluid bed dryer, or on a hot two-roll mill.

The dried neutralized sulfonated elastomeric polymer can be compounded with various additives in order to modify its physical and rheological properties. These additives are selected from the group consisting of nonpolar waxes, extender oils, fillers, pigments, ionic group plasticizers, antioxidants, stabilizers, and mixtures thereof. The additive or mixture of additives is incorporated into the neutralized sulfonated elastomer at a concentration level of about 1 to about 300 parts by weight per hundred parts of neutralized sulfonated elastomeric polymer, more preferably about 5 to about 275; most preferably about 10 to about 250.

Alternatively, the unneutralized sulfonated elastomeric polymer can be isolated as a crumb by steam stripping. The additives are compounded into the fluxed unneutralized sulfonated elastomeric polymer, the neutralizing agent and plasticizer are then added, and fluxing is continued until the sulfonate groups have been neutralized to at least about 95%. The advantage of this alternate method is that the viscosity of the unneutralized sulfonated elastomeric polymer is substantially lower than the viscosity of the neutralized sulfonated elastomeric polymer thereby facilitating better compounding with the additives to be incorporated.

The fillers employed in the present invention are selected from carbon blacks, talcs, ground calcium carbonate, water precipitated calcium carbonate, and delaminated, calcined and hydrated clays and mixtures thereof. Examples of carbon black are the furnace, channel or thermal blacks. These fillers are incorporated into the blend composition at about 10 to about 200 parts per hundred by weight based on 100 parts of the neutralized sulfonated elastomeric polymer, more preferably at about 10 to about 150 parts per hundred; and most preferably at about 25 to about 150 parts per hundred.

The waxes employed in the present invention are selected from the group consisting of polyolefinics, paraffins, aromatics, and naphthenics. In particular, the waxes employed in this present invention have a softening point of about 135° F. to about 220° F., more preferably about 135° F. to about 200° F. and most preferably about 150° F. to about 200° F. The preferred waxes have less than 2 wt. % of polar type compounds and an $\overline{M}n$ of about 1000 to about 5000, more preferably about 1500 to about 3000. The waxes contemplated for use in this present invention can be selected from the group consisting of synthetic, petroleum, and natural waxes.

The waxes are incorporated into the blend composition at a concentration level of about 1 to about 50 parts by weight per hundred, 100 parts of the neutralized sulfonated polymers, more preferably about 1 to about 40, and most preferably about 1 to about 30.

The oils employed in the present invention are nonpolar process oils having less than about 2 wt. % polar type compounds as measured by molecular type clay gel analyses. These oils are selected from paraffinics ASTM Type 10B as defined in ASTM D-2226-70, Aromatics ASTM Type 102 or Naphthenics ASTM Type 104A, wherein the oil has a flash point by the open cup of at least 350° F., a pour point of less than 40° F., a viscosity of about 70 to about 3000 ssu's and a number average molecular weight of about 400 to about 1000, and more preferably about 300 to about 750. The preferred process oils are paraffinics. The oils are incorporated into the blend compositions at about 10 to about 250 parts by weight per 100 parts of the neutralized sulfonated elastomeric polymer, more preferably at about 25 to about 150; and most preferably at about 50 to about 150.

A metallic hydroxide can be incorporated into the blend composition as a means of neutralizing any residual free carboxylic acid ionic plasticizer in the neutralized sulfonated terpolymer. The metallic hydroxide is incorporated at a concentration level of about less than 2.0 parts by weight per 100 parts of the neutralized sulfonated elastomeric polymer, wherein the metal ion of the metallic hydroxide is selected from Group II-A of the Periodic Table of Elements, e.g., barium, calcium, and magnesium.

DETAILED DESCRIPTION

The advantages of the process for the sulfonation of wet polymer cements can be more readily appreciated by reference to the following examples and tables.

EXAMPLE I

A 1.0 molar solution of a 1/1 $SO_3$/triethyl phosphate (TEP) complex in 1,2-dichloroethane (DCE) was prepared by adding 80.1 g of liquid $SO_3$ (1.0 mole) to a solution of 182.2 g (1.0 mole) of TEP in 787 ml. of DCE.

Four cements were prepared as follows: into 1000 ml. of Exxon hexane was dissolved 100 g of an ethylene-propylene-5-ethylidene-2-norbornene copolymer, Vistalon 2504-20. The copolymer contained about 50 wt. % ethylene and about 5 wt. % 5-ethylidene-2-norbornene. It possessed a Mooney viscosity (ML, 1+8, 212° F.) of about 20. This polymer was produced through the hot extrusion breakdown of commercial 40 Mooney Vistalon 2504 and additionally had been dried on a rubber mill so that little water was contained in the polymer.

Into three of the cements was added 0.5 ml., 1.0 ml. and 2.0 ml. of water. Then into each cement at room temperature was added 37.5 ml. of the 1.0 molar $SO_3$/TEP complex (37.5 mmoles). The cements were stirred for 30 minutes at room temperature and then inactivated with 150 ml. of isopropanol. Antioxidant 2246 (0.5 g) was added, and the acid form of the sulfonated polymer was isolated by steam stripping. The polymer was pulverized and water-washed in a Waring blender, and the wet crumb was dewatered and dried at about 120° F. on a two-roll rubber mill.

Five grams of the sulfonated polymer was dissolved in 100 ml. of 95 toluene-5-methanol, and the solution was titrated with 0.1 N ethanolic NaOH to an Alizarin-Thymophthalein endpoint. Dietert sulfur determinations were made on each sulfonated polymer. The results are shown in Table I.

Even without the addition of water to the cement, the conversion of the $SO_3$/TEP complex to the sulfonated elastomeric EPDM terpolymer was already very low (23%). The addition of water further reduced the sulfur level and further lowered reagent ($SO_3$/TEP complex) conversion to the sulfonated elastomeric EPDM terpolymer.

This example illustrates the deleterious effects of water on the $SO_3$/TEP complex.

TABLE 1

| Run | $SO_3$- PHOSPHATE (1/1) COMPLEXES | | | | | | | | |
|---|---|---|---|---|---|---|---|---|---|
| | IA | IB | IC | ID | IIA | IIB | IIC | IID | IIIA |
| $H_2O$ Scavenger | none | none | none | none | $Ac_2O$ | $Ac_2O$ | $Ac_2O$ | $Ac_2O$ | $Ac_2O$ |
| Weight, g. | — | — | — | — | 3.57 | 6.43 | 9.29 | 14.91 | 5.72 |
| Volume, Ml. | — | — | — | — | 3.29 | 5.92 | 8.55 | 13.71 | 5.26 |
| Mmoles | — | — | — | — | 35 | 63 | 91 | 146 | 56 |
| Mode of Addition | — | — | — | — | Cement | Cement | Cement | Cement | Premix |
| Water Added, Ml. | 0 | 0.5 | 1.0 | 2.0 | 0 | 0.5 | 1.0 | 2.0 | 0 |
| Mmoles | 0 | 27.8 | 55.5 | 111 | 0 | 27.8 | 55.5 | 111 | 0 |
| $SO_3H$ Content, meq./100 g. | | | | | | | | | |
| By Titration | 13.6 | 12.4 | 7.8 | 10.4 | 34.6 | 34.6 | 35.4 | 35.8 | 33.8 |
| By Sulfur Analysis | 8.4 | 9.1 | 6.3 | 6.7 | 34.5 | 34.2 | | | |
| By 28.9 | 32.7 | | | | | | | | |
| Conversion, % | 23 | 24 | 17 | 118 | 95 | 94 | 97 | 79 | 90 |

| Run | IIIB | IIIC | IVA | IVB | IVC | IVD | VA | VB |
|---|---|---|---|---|---|---|---|---|
| $H_2O$ Scavenger | $Ac_2O$ | $Ac_2O$ | AcCl | AcCl | AcCl | AcCl | AcCl | AcCl |
| Weight, g. | 6.43 | 14.91 | 2.75 | 4.95 | 7.14 | 11.46 | 4.40 | 7.14 |
| Volume, Ml. | 5.92 | 13.71 | 2.49 | 4.48 | 6.46 | 10.37 | 3.98 | 6.46 |
| Mmoles | 63 | 146 | 35 | 63 | 91 | 146 | 56 | 91 |
| Mode of Addition | Premix | Premix | Cement | Cement | Cement | Cement | Premix | Premix |
| Water Added, Ml. | 0.5 | 2.0 | 0 | 0.5 | 1.0 | 2.0 | 0 | 1.0 |
| Mmoles | 27.8 | 111 | 0 | 27.8 | 55.5 | 111 | 0 | 55.5 |
| $SO_3H$ Content, meq./100 g. | | | | | | | | |
| By Titration | 34.4 | 35.0 | 29.6 | 33.8 | 33.8 | 32.8 | 32.0 | 33.8 |
| By Sulfur Analysis | 34.4 | 37.0 | 29.5 | 30.2 | 33.4 | — | 29.2 | 30.2 |
| Conversion, % | 94 | 102 | 82 | 83 | 92 | — | 80 | 83 |

$Ac_2O$ = acetic anhydride and AcCl = acetyl chloride

EXAMPLE II

Four sulfonations were effected with the $SO_3$/TEP complex and EPDM cements as described in Example I. In all cases, acetic anhydride was added to the cement prior to the addition of the sulfonation reagent. Into three of the cements was added 0.5, 1.0, and 2.0 ml. of water followed by an amount of acetic anhydride equal to 35 mmoles plus the number of mmoles of water added. To each cement was added 37.5 ml. of the 1.0 M $SO_3$/TEP complex described in Example I. The cements were stirred for 30 minutes at room temperature and then inactivated with 150 ml. isopropanol. The sulfonated polymers were worked up and analyzed as described in Example I. Results are shown in Table I.

When sulfonation was effected in the absence of acetic anhydride (Control Run I-A) a reagent ($SO_3$/TEP complex) conversion to the sulfonated EPDM terpolymer of only 23% was obtained. However, when 35 mmoles of acetic anhydride was added to the cement (Run II-A) conversion of the sulfonation complex ($SO_3$/TEP complex) increased markedly to 95%. When water had been added to the cement and the cement treated with sufficient acetic anhydride (Runs II-B, II-C, II-D) the conversion of the reagent ($SO_3$/TEP complex) to the sulfonated elastomeric EPDM terpolymer still remained high (94%, 97%, 79%, respectively).

This example dramatically illustrates the beneficial effect of the addition of acetic anhydride added to wet polymer cements on the conversion of $SO_3$/TEP sulfonation complexes to polymeric sulfonate.

EXAMPLE III

Three sulfonations were effected with the cements and reagents described in Example I. In two instances, 0.5 ml and 2.0 ml. of water was added to the cement. Then 37.5 ml. of 1.0 M $SO_3$/TEP in DCE solution (37.5 mmoles) was premixed with various amounts of acetic anhydride and then the solution was added directly to the cement. The cement was stirred for 30 minutes at room temperature and then inactivated with 150 ml. of isopropanol. The sulfonated polymers were worked up and analyzed as described in Example 1. Results are shown in Table I.

The control (Run I-A) wherein no acetic anhydride was used gave a reagent conversion ($SO_3$/TEP complex) to the sulfonated EPDM terpolymer of only 23%. However, when the reagent ($SO_3$/TEP complex) was premixed with 56 mmoles of acetic anhydride and then added to the cement, a dramatic increase of reagent conversion ($SO_3$/TEP complex) to sulfonated EPDM terpolymer of 90% was obtained. Similarly, when water had been added to the cement (Runs III-B, III-C) the premixing of the reagent ($SO_3$/TEP complex) with sufficient acetic anhydride to counteract the water again maintained a high reagent conversion.

This example shows that in the sulfonation of wet cements with $SO_3$/TEP complexes can be accomplished with high reagent conversion ($SO_3$/TEP complex) to sulfonated EPDM terpolymer through the premixing of the reagent $SO_3$/TEP complex with sufficient acetic anhydride to counterbalance all of the water present in the cement.

EXAMPLE IV

The four runs described in Example II were repeated with the exception that the acetic anhydride was replaced with equimolar amounts of acetyl chloride. The results are shown in Table I.

The addition of 35 mmoles of acetyl chloride to the cement prior to the addition of the $SO_3$/TEP complex sulfonation reagent increased the reagent conversion ($SO_3$/TEP complex) to sulfonated EPDM terpolymer from 23% (Control, Run I-A) to 82%. When water was added to the cements (Runs IV-B, IV-C, IV-D) but sufficient acetyl chloride added to counteract the water, reagent conversions remained high.

This example illustrates the beneficial effects upon reagent conversion achieved through the addition of acetyl chloride to wet polymer cements in the sulfonation of EPDM with $SO_3$/TEP complexes.

EXAMPLE V

Two sulfonations were effected as described in Example I. In one instance (Run V-B) 1.0 ml. of water was added to the cement. Then 37.5 ml. of 1.0 M $SO_3$/TEP in DCE solution was premixed with 56 mmoles (Run V-A) and 91 mmoles (Run V-B) of acetyl chloride. The solutions were added directly to the cements. The cement was stirred for 30 minutes at room temperature and then inactivated with 150 ml. isopropanol. The sulfonated polymers were worked up and analyzed as described in Example I. The results are shown in Table I.

Premixing acetyl chloride with the reagent ($SO_3$/TEP complex) increased the reagent conversion ($SO_3$/TEP complex) to sulfonated EPDM terpolymer from 23% (Control, Run I-A) to 80%. Reagent conversion remained high even when 1 weight % water was present.

This example demonstrates the sulfonation of wet cements with $SO_3$/TEP complexes to high reagent conversion ($SO_3$/TEP complex) to sulfonated EPDM terpolymer through the premixing of the reagent $SO_3$/TEP complex with amounts of acetyl chloride sufficient to counteract all of the water in the sulfonation system.

EXAMPLE VI

Four EPDM cements were prepared as described in Example I. Into 3 of the cements was added 0.5 ml., 1.0 ml. and 2.0 ml. of water (Runs VIII-A, VIII-B, VIII-C). Then into each cement was added 75.0 ml. of 0.5 molar 1/1 $SO_3$/p-dioxane in DCE (37.5 mmoles). The cements were stirred for 30 minutes at room temperature and then inactivated with 150 ml. isopropanol. The polymers were worked up and analyzed as described in Example I. The results are shown in Table II.

In the absence of any added water, a respectable conversion of $SO_3$/dioxane complex to sulfonated EPDM terpolymer of 71% was obtained. The addition of water dropped the conversions to 51%, 47%, and 40% as the water added to the cement increased 0.5%, 1.0% and 2.0%, respectively.

This example illustrates the deleterious effects of water upon the sulfonation of EPDM with $SO_3$/dioxane complexes.

EXAMPLE VII

The four runs in Example VI were repeated except that to each cement was added an amount of acetic anhydride equal to 35 mmoles plus the number of mmoles of water added. The results are shown in Table II. In all cases, the reagent conversion of $SO_3$/dioxane complex to sulfonated EPDM terpolymer was 90% or greater.

This example demonstrates the sulfonation of wet cements with $SO_3$/dioxane complexes to high reagent conversions of $SO_3$/dioxane complex to sulfonated EPDM terpolymer through the addition of acetic anhydride to the cement.

TABLE II

| | 0.5 MOLAR $SO_3$-DIOXANE (1/1) COMPLEX [a] | | | | | | | |
|---|---|---|---|---|---|---|---|---|
| Run | VIA | VIB | VIC | VID | VIIA | VIIB | VIIC | VIID |
| $H_2O$ Scavenger | none | none | none | none | $Ac_2O$ | $Ac_2O$ | $Ac_2O$ | $Ac_2O$ |
| Weight, g. | — | — | — | — | 3.57 | 6.43 | 9.29 | 14.91 |
| Volume, Ml. | — | — | — | — | 3.29 | 5.92 | 8.55 | 13.71 |
| Mmoles | — | — | — | — | 35 | 63 | 91 | 146 |
| Water Added, Ml. | 0 | 0.5 | 1.0 | 2.0 | 0 | 0.5 | 1.0 | 2.0 |
| Mmoles | 0 | 27.8 | 55.5 | 111 | 0 | 27.8 | 55.5 | 111 |
| $SO_3H$ Content, meq./100 g. | | | | | | | | |
| By Titration | 29.0 | 23.0 | 22.0 | 18.4 | 32.8 | 33.6 | 35.2 | 32.8 |
| By Sulfur Analysis | 26.1 | 19.2 | 17.3 | 15.0 | 32.7 | 33.1 | 32.7 | 33.1 |

TABLE II-continued

| | 0.5 MOLAR SO₃-DIOXANE (1/1) COMPLEX [a] | | | | | | | |
|---|---|---|---|---|---|---|---|---|
| Run | VIA | VIB | VIC | VID | VIIA | VIIB | VIIC | VIID |
| Conversion, % | 71 | 51 | 47 | 40 | 90 | 91 | 90 | 91 |

[a]75.0 ml of 0.5 m reagent (37.5 mmoles of reagent) used per run (100 g. EPDM)

What is claimed is:

1. In a process for the sulfonation of an unsaturated elastomeric polymer to form a sulfonated elastomeric polymer, wherein a cement consisting essentially of of said unsaturated elastomeric polymer in a non-reactive solvent is contacted with a sulfonating agent in a reaction zone at about $-100°$ C. to about $+100°$ C. for a time sufficient to result in the formation of a sulfonated elastomeric polymer having about 15 to about 50 meq. of sulfonate groups per 100 grams of said sulfonated elastomeric polymer, the improvement which comprises using a sulfonating agent comprising a mixture of a sulfur trioxide donor complexed with a Lewis base and a second reagent being selected from the group consisting of $(RCO)_2O$ and $RCOX$ and mixtures thereof, a molar-ratio of said second reagent to said $SO_3$ of said complex being at least 0.5, wherein R is selected from the group consisting of $CH_3-$, $C_2H_5-$, $C_3H_7-$, $C_4H_9-$, $C_5H_{11}-$, $C_6H_{13}$ and $C_6H_5CH_2-$ and mixtures thereof, and X is selected from the group consisting of F, Cl, Br and I.

2. The process of claim 1, wherein said sulfonating agent is formed by mixing said $SO_3$ complex and said second reagent prior to addition to said cement.

3. The process of claim 1, wherein said sulfonating agent is formed through separate additions of the $SO_3$•-complex and the second reagent to said cement.

4. The process of claim 1, wherein said sulfonating agent is formed from a mixture of said $(RCO)_2O$ and said complex.

5. The process of claim 1, wherein said sulfonating agent is formed from a mixture of said $(RCO)_2O$, said RCOCl, and said complex.

6. The process of claim 1, wherein said sulfonating agent is formed from a mixture of RCOCl and said complex.

7. The process of claim 1, wherein said elastomeric polymer has at least about 0.2 wt.% of water.

8. The process of claim 1, wherein said elastomeric polymer is neoprene.

9. The process of claim 1, wherein said unsaturated elastomeric polymer is selected from the group consisting of Butyl rubbers, styrene-butadiene copolymers, isoprenestyrene copolymers and EPDM terpolymers.

10. The process of claim 1, wherein said acid form of said sulfonated elastomeric polymer has about 20 to about 40 meq. sulfonate groups per 100 grams of said sulfonated elastomeric polymer.

11. The process of claim 1, further including neutralizing at least about 90% of said sulfonate groups with a metal counterion selected from the group consisting of antimony aluminum, lead, Groups I-A, II-A, I-B and II-B of the Periodic Table of Elements and mixtures thereof.

12. The process of claim 11, further including adding a preferential plasticizer at a concentration level of at least about 3 parts by weight per 100 parts of said neutralized sulfonated elastomeric polymer.

13. The process of claim 12, further including adding an additive to said neutralized sulfonated elastomeric polymer at a concentration level of less than about 300 parts by weight per 100 parts of said neutralized sulfonated elastomeric polymer.

14. The process of claim 13, wherein said additive is selected from the group consisting of oils, fillers, waxes, pigments, a metallic hydroxide and stabilizers and mixtures thereof.

15. The process of claim 1, wherein said nonreactive solvent is selected from the group consisting of aliphatic hydrocarbons, chlorinated aliphatics, aromatic hydrocarbons, and chlorinated aromatic hydrocarbons and mixtures thereof.

16. The process of claim 1, wherein said cement has less than 0.1 wt. % water based on said elastomeric polymer.

17. The process of claim 1, wherein said unsaturated elastomeric polymer is an EPDM' terpolymer.

* * * * *